US009836147B2

(12) United States Patent
Li et al.

(10) Patent No.: US 9,836,147 B2
(45) Date of Patent: Dec. 5, 2017

(54) COLOR FILTER SUBSTRATE AND TOUCH DISPLAY DEVICE

(71) Applicants: Shanghai Tianma Micro-Electronics Co., Ltd., Shanghai (CN); Tianma Micro-Electronics Co., Ltd., Shenzhen (CN)

(72) Inventors: Xiaoran Li, Shanghai (CN); Qijun Yao, Shanghai (CN); Lingxiao Du, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 83 days.

(21) Appl. No.: 14/706,210

(22) Filed: May 7, 2015

(65) Prior Publication Data

US 2016/0077619 A1 Mar. 17, 2016

(30) Foreign Application Priority Data

Sep. 15, 2014 (CN) .......................... 2014 1 0468464

(51) Int. Cl.
*G02F 1/1335* (2006.01)
*G06F 3/041* (2006.01)
*G02B 5/20* (2006.01)

(52) U.S. Cl.
CPC ............. *G06F 3/041* (2013.01); *G02B 5/201* (2013.01); *G02F 1/133514* (2013.01)

(58) Field of Classification Search
CPC ..... G06F 3/041; G06F 3/044; G02F 1/133514
USPC .......... 345/173–174; 349/106, 110, 111, 141
See application file for complete search history.

(56) References Cited

U.S. PATENT DOCUMENTS

| 8,519,967 | B2 * | 8/2013 | Chien | G06F 3/0412 |
| | | | | 178/18.06 |
| 9,256,307 | B2 * | 2/2016 | Oh | G06F 3/041 |
| | | | | 345/173 |
| 2010/0283762 | A1 * | 11/2010 | Takusa | G06F 3/044 |
| | | | | 345/174 |
| 2011/0116215 | A1 * | 5/2011 | Chang | G02F 1/1339 |
| | | | | 361/679.01 |
| 2014/0210774 | A1 * | 7/2014 | Kim | G06F 3/044 |
| | | | | 345/174 |

FOREIGN PATENT DOCUMENTS

| CN | 2567661 Y | 8/2003 |
| CN | 102760017 A | 10/2012 |
| CN | 202904525 U | 4/2013 |
| CN | 103257747 A | 8/2013 |
| CN | 103365521 A | 10/2013 |
| CN | 103576998 A | 2/2014 |
| CN | 103792711 A | 5/2014 |

* cited by examiner

*Primary Examiner* — Audrey Y Chang
(74) *Attorney, Agent, or Firm* — Faegre Baker Daniels LLP

(57) ABSTRACT

The present disclosure provides a color filter substrate, including: a base, a wiring layer disposed on the base, and a color filter layer disposed on the wiring layer, wherein the color filter layer includes a plurality of color filters, the wiring layer includes a plurality of wirings, the plurality of wirings extend along a first direction and an edge of each of the wirings is in a non-straight line shape in the first direction.

16 Claims, 5 Drawing Sheets

000## COLOR FILTER SUBSTRATE AND TOUCH DISPLAY DEVICE

CROSS-REFERENCE TO RELATED APPLICATION

This application claims priority to Chinese Application No. 201410468464.5, filed Sep. 15, 2014, which is herein incorporated by reference in its entirety.

TECHNICAL FIELD

The present application relates to the field of touch display technologies, in particular to a color filter substrate provided with a wiring, and a touch display device.

BACKGROUND

In recent years, touch panels have been widely used. A touch screen having a touch panel, which is also referred to as a touch control screen, is an inductive display device which can receive a touch operation to generate an input signal. As the latest input device, the touch panel currently represents the simplest and the most convenient and natural human-machine interaction manner. A huge amount of the touch panels have been applied to electronic products for consumption, communication and computers, for example, to game machines, smartphones and tablet computers to function as input/output interfaces of the electronic products. Display parts of the electronic products are generally touch display devices formed by touch panels and display panels, and can allow a user to input an action to be performed by clicking with a finger or a touch pen according to displayed function options, as such, inputs can be performed without other conventional input devices (such as buttons, keyboards or joysticks), thus significantly improving convenience of input.

In order to achieve lighter and thinner touch display devices, a touch structure is directly integrated into a display device in the related art, for example, by integrating the touch structure into a color filter substrate in the display device. However, there is a problem in the related art that defects such as rupture of the film forming a color filter layer of the color filter substrate occur due to the presence of the touch structure.

SUMMARY

The present disclosure provides a color filter substrate, including: a base, a wiring layer disposed on the base, and a color filter layer disposed on the wiring layer, wherein the color filter layer includes a plurality of color filters, the wiring layer includes a plurality of wirings, the plurality of wirings extend along a first direction and an edge of each of the wirings is in a non-straight line shape in the first direction.

The present disclosure further provides a touch display device, including the color filter substrate.

While multiple embodiments are disclosed, still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

Figure 1:
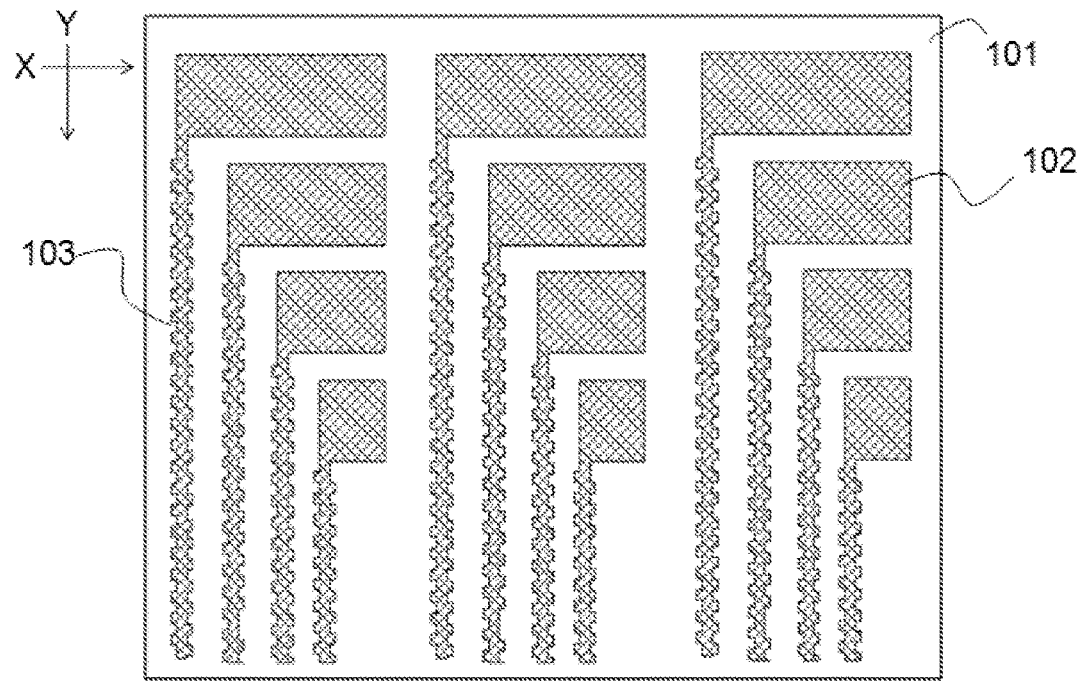
FIG. 1 is a schematic top view of the color filter substrate, according to embodiments of the disclosure.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

Embodiments of the disclosure provide a color filter substrate, including: a base, a wiring layer disposed on the base and a color filter layer disposed on the wiring layer, where the wiring layer includes a plurality of wirings extending along a first direction, and the plurality of wirings are in a non-straight line shape in the first direction.

Figure 2:
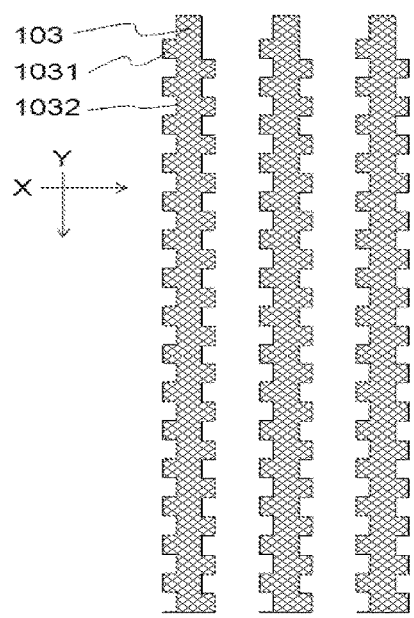
FIG. 2 is an enlarged schematic view of the wirings shown in FIG. 1, according to embodiments of the disclosure.

Particularly, referring to FIG. 1 which is a schematic top view of the color filter substrate, according to embodiments of the disclosure and FIG. 2 which is an enlarged schematic view of the wirings shown in FIG. 1, according to embodiments of the disclosure, the color filter substrate includes a base 101, and a touch structure disposed on the base 101. The touch structure includes touch electrodes 102 and wirings 103, where the wiring 103 is configured to transmit a touch signal, an end of the wiring 103 is connected to a corresponding touch electrode 102, and the other end of the wiring 103 is connected with a touch signal inputting terminal. The wiring 103 extends along the first direction, which is a direction Y in the first embodiment, i.e. the wiring 103 extends along the direction Y. An edge of the wiring 103 is in a non-straight line shape in the direction Y. In some embodiments, the edge of the wiring 103 is provided with a plurality of protrusions 1031 and hence is in a non-straight line shape due to the existence of the plurality of protrusions 1031.

Figure 3:
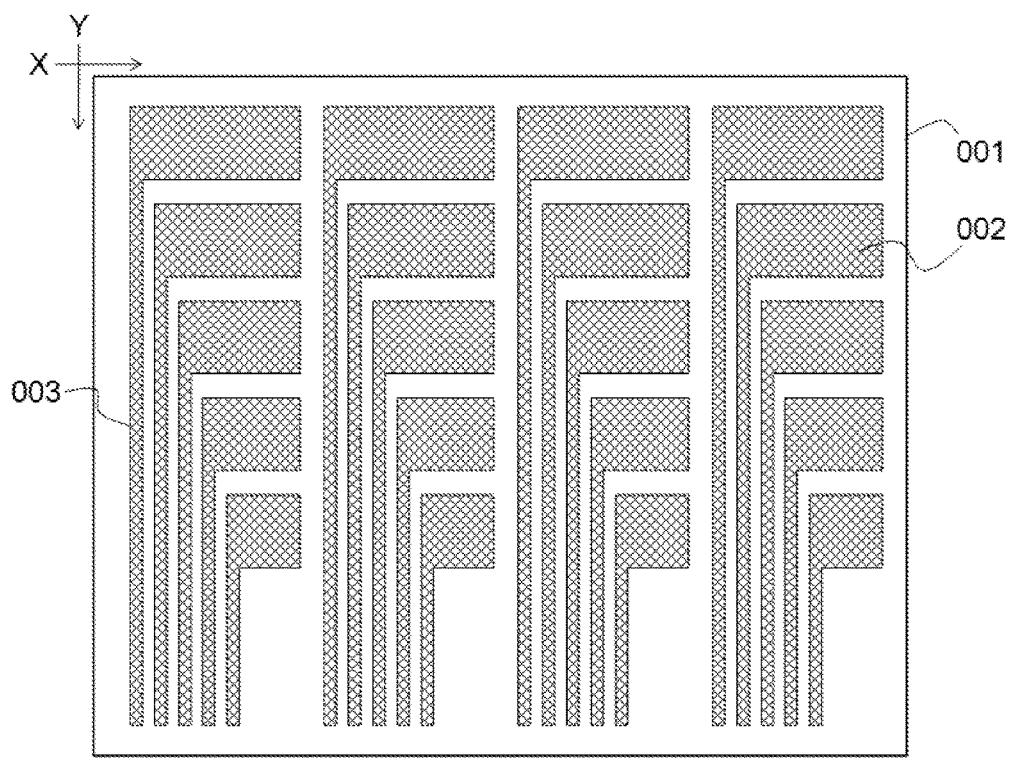
FIG. 3 is a schematic top view of the color filter substrate having a touch structure in the related art.

As described in the background, there is a problem in the related art that a touch structure in a color filter substrate leads to the defect of the film for forming the color filter layer, this is due to the fact that the film for forming the color filter layer would be ruptured by the edge of the wiring in the touch structure. Referring to FIG. 3 which is a schematic top view of the color filter substrate having a touch structure in the related art and FIG. 4 which is a schematic diagram of a color filter layer of the color film substrate upon its film formation in the related art, the color filter substrate includes a base 001, and a touch structure disposed on the base 001, where the touch structure includes touch electrodes 002 and wirings 003 extending along the first direction, and an edge of the wiring 003 is in a straight line shape.

The color filter substrate is manufactured by following processes. A base 001 is provided; then a black matrix layer (not shown) having a plurality of openings is formed on the base 001; and a touch structure including the touch electrodes 002 and the wirings 003 is formed on the black matrix layer, where an edge of the wiring 003 is in a straight line shape. Then, color filters respectively corresponding to the plurality of openings of the black matrix layer are formed.

In general, the color filter layer includes color filters of at least three colors, i.e. red color filters R, green color filters G and blue color filters B. The color filters of the three colors are sequentially formed on the base 001 through three coating and etching processes, and a coating direction of the color filter layer is perpendicular to an extending direction of the wiring 003. Particularly, an entire first color filter layer is firstly coated on the base 001 along a second direction perpendicular to the first direction, where the first color filter layer may be a red color filter layer, and then the red color filter layer is etched to merely remain the partial red color filters; then an entire second color filter layer is coated on the base 001 along the second direction perpendicular to the first direction, where the second color filter layer may be a green color filter layer, and then the green color filter layer is etched to merely remain the partial green color filters; and then similarly, an entire third color filter layer is coated on the base 001 along the second direction perpendicular to the first direction, where the third color filter layer may be a blue color filter layer, and then the blue color filter layer is etched to merely remain the partial blue color filters.

Figure 4:
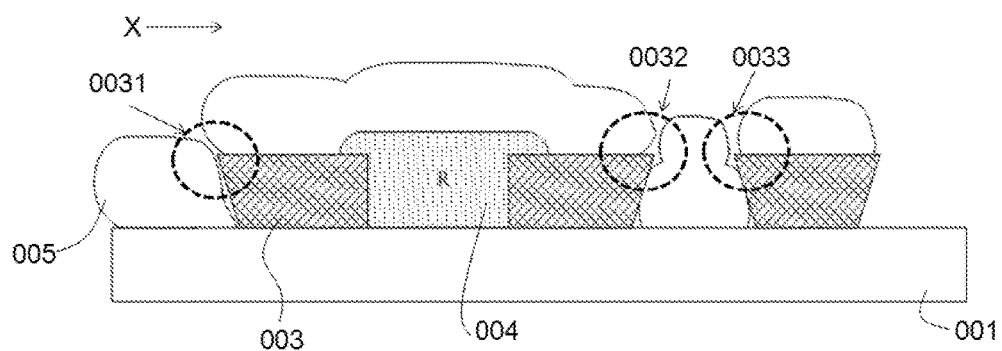
FIG. 4 is a schematic diagram of a color filter layer of the color film substrate upon its film formation in the related art.

Referring to FIG. 4, when forming the first color filters 004, the coated first color filter layer would cover all of the wirings 003, and then first color filters at locations where the second color filters and the third color filters are to be disposed subsequently are etched away from the first color filter layer, where the etching may be wet etching, and the first color filter layer is etched with etchant.

While the first color filter layer is etched, the etchant can also etch the wirings 003, so that a sharp chamfer is formed at a side edge of the wiring 003 that is away from the base 001, as indicated by 0031, 0032, and 0033 in FIG. 4, for example. The edge of the wiring 003 extending along the first direction is like a long scraper knife due to the existence of the sharp chamfers. When the second color filter layer is coated along the second direction, liquid tension of the second color filter layer would be destroyed by the sharp chamfers, therefore the second color filter layer cannot be stuck at the sharp chamfers, and defects such as rupture of the film forming the second color filter layer likely occur when applying the second color filter layer.

In embodiments of the present disclosure, the edge of the wiring 103 is designed in a non-straight line shape to solve the problem that the liquid tension of the color filter layer is destroyed by wirings. The wiring 103 extends along the first direction which is a direction Y. The edge of the wiring 103 is provided with a plurality of protrusions 1031, and hence is in a polygonal line shape due to the existence of the plurality of protrusions 1031. Referring to FIG. 2, protrusions at the edge of the wiring 103 other than the protrusions are defined as concave portions 1032. While etching the color filter layer, although sharp chamfers still would be formed at a side edge of the wiring 103 that is away from the substrate 101, i.e. the wiring 103 has a trapezoid cross-section and a relatively short bottom edge of the trapezoid cross-section is in contact with the base 101, sharp edges of the same wiring 103 would be staggered relative to each other, i.e. sharp edges of the protrusions 1031 are located outwardly, and sharp edges of the concave portions 1032 are located inwardly, so that the sharp edges of the protrusions 1031 would not be connected with the sharp edges of the concave portions 1032 to form a straight line. When a next color filter layer is coated along the second direction, liquid material of the color filter layer can be stuck to the edge of the wiring 103 by the liquid tension or stickiness at the relatively small sharp edges, therefore defects such as rupture of the film forming the next color filter layer would not occur. The second direction is perpendicular to the first direction, and may be the direction X.

Preferably, the length of the protrusion 1031 in the direction Y is within a range from the length of one color filter to the length of five color filters, and the appropriate length of the protrusion 1031 in the direction Y enables material of the color filter layer to be stuck to edges of the wirings.

In some embodiments, the wiring 103 is made of transparent metal oxide, and the protrusions 1031 and the wirings 103 are made of the same material and are formed simultaneously.

Figure 5:
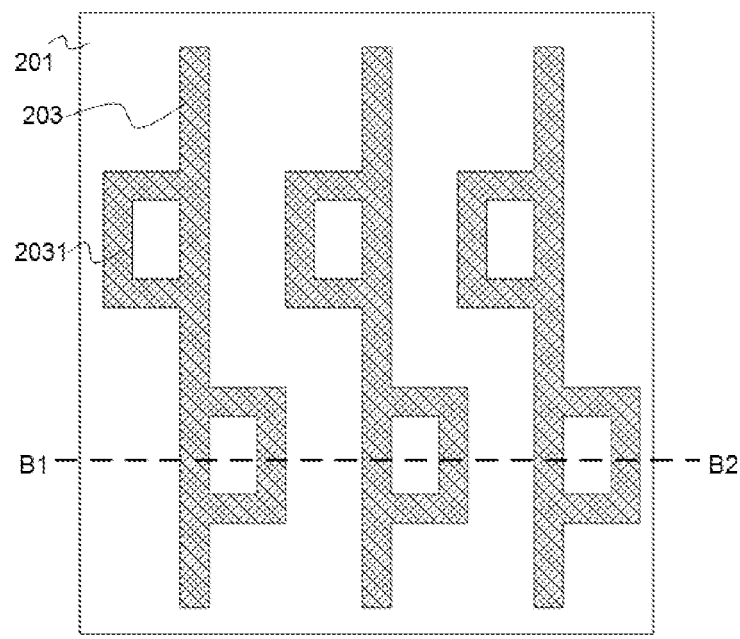
FIG. 5 is a schematic top view of the color filter substrate, according to embodiments of the disclosure.
Figure 6:
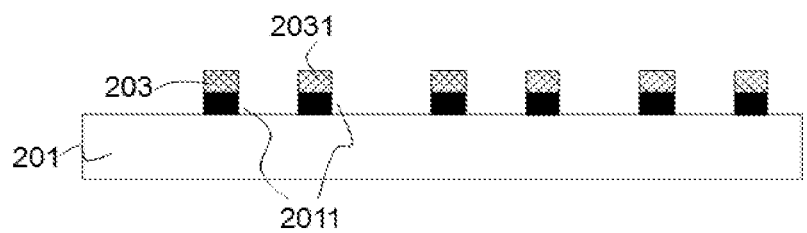
FIG. 6 is a cross-sectional view of the color filter substrate along a line B1-B2 in FIG. 5, according to embodiments of the disclosure.

Referring to FIG. 5 which is a schematic top view of the color filter substrate, according to embodiments of the disclosure, and FIG. 6 which is a cross-sectional view of the color filter substrate along a line B1-B2 in FIG. 5, according to embodiments of the disclosure, a plurality of wirings 203 are formed on a base 201 and made of metal. The plurality of wirings 203 extend along the first direction, and protrusions 2031 are disposed at an edge of the wiring 203, where the protrusions 2031 are also made of metal and formed in the same process as the wirings 203. A black matrix layer 2011 is formed between the substrate 201 and the wirings 203 as well as the protrusions 2031, where the wirings 203 and the protrusions 2031 are shielded by the black matrix layer 2011 in a light transmitting direction. In integrating the touch structure into the color filter substrate, in some embodiments, the wirings are formed of metal; in this case, the wirings and the protrusions need to be shielded and hence are arranged to overlap with the black matrix layer so as to prevent the touch structure from occupying a light permeable region. Certainly, when being made of transparent metal oxide, the wirings and the protrusions may also be arranged to overlap with the black matrix layer so as to ensure transmittance consistence.

In some embodiments, the protrusions are provided at both edges of the wiring. In some embodiments, protrusions are provided at one side of a wiring adjacent to a first color filter, which is away from the first color filter, and the other side of the wiring is covered by the first color filter. Referring to FIG. 4, the wirings 003 are covered when coating the film forming a first color filter layer; when forming the first color filter 004 by etching, one side of the wiring 003 adjacent to the first color filter 004 is still covered and protected by the first color filter 004 from being etched by etchant, therefore sharp chamfers would not be formed and protrusions are unnecessary at this side of the wiring 003, so that only the other side of the wiring 003 that is away from the first color filter 004 is provided with protrusions.

Figure 7:
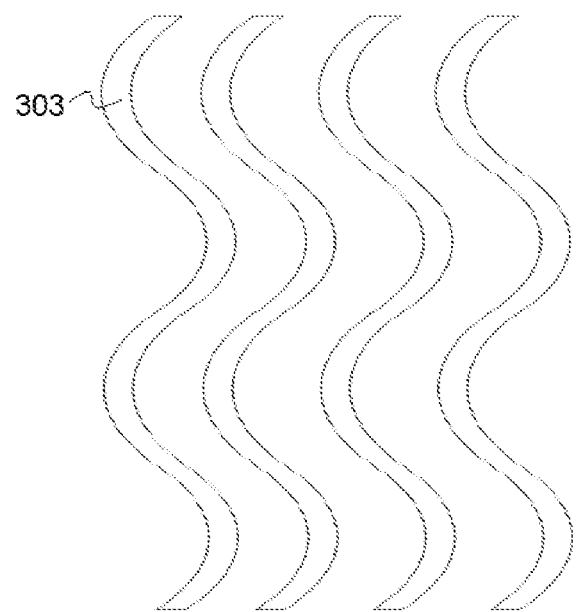
FIG. 7 is a schematic diagram of the wirings, according to embodiments of the disclosure.
Figure 8:
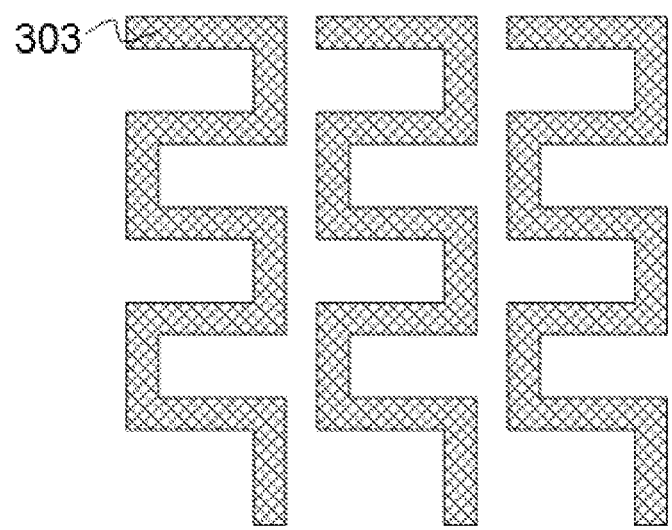
FIG. 8 is a schematic diagram of the wirings, according to embodiments of the disclosure.

Referring to FIGS. 7 and 8, which are schematic diagrams of the wirings provided by additional embodiments of the disclosure, the wiring 303 may also be in a curved shape or a polygonal line shape, which can prevent sharp chamfers at an edge of the wiring from being aligned in a line, and prevent defects such as rupture of the film forming the color filter layer when applying the color filter layer Embodiments provide a touch display device, which includes the above mentioned color filter substrate.

It is noted that embodiments illustratively illustrate the structure of the wiring in the touch structure, and it should be understood by those skilled in the art that description of other known structures may be omitted or not given in detail. In the disclosure, the wiring on the color filter substrate can be applied to a self-capacitive structure or a mutual capacitive structure. The touch electrode may be a driving electrode or a sensing electrode, and the wiring may be a driving signal transmitting wiring or a sensing signal transmitting wiring. The disclosure does not limit the type of the touch structure or the signal transmitting wiring.

Figure 9:
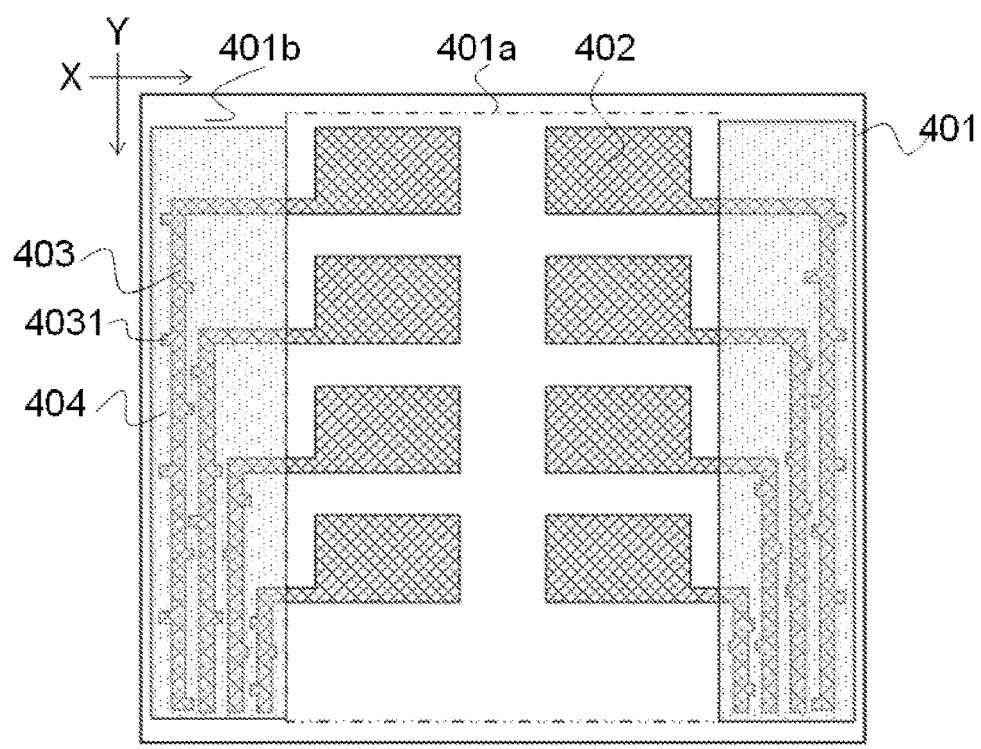
FIG. 9 is a schematic diagram of a color filter substrate, according to embodiments of the disclosure.

Referring to FIG. 9 which is a schematic diagram of a color filter substrate, according to embodiments of the disclosure, the color filter substrate includes a base 401 and a touch structure disposed on the base 401, where the touch structure includes touch electrodes 402 and wirings 403, and the wirings 403 are touch signal transmitting wirings and respectively connected to corresponding touch electrodes 402.

The color filter substrate is divided into a display region 401a and a peripheral region 401b surrounding the display region 401a. In the display region 401a, the wirings 403 extend along a second direction until to the peripheral region 401b. In the peripheral region 401b, the wirings 403 extend along a first direction perpendicular to the second direction. In some embodiments, the first direction is represented by a direction Y, and the second direction is represented by a direction X. An edge of the wiring 403 in the peripheral region 401b is in a non-straight line shape in the direction Y. In some embodiments, the edge of the wiring 403 is provided with a plurality of protrusions 4031, where the edge of the wiring 403 is in a non-straight line shape due to the existence of the plurality of protrusions 4031.

The edge of the wiring 403 is provided with the plurality of protrusions 4031 to reduce rupture risk of the film forming the color filters when coating the film, as like in previously described embodiments, which is not discussed repeatedly. Further, a portion of the wiring 403 that extends along the first direction is arranged in the peripheral region. When coating the color filter layer along the second direction, the color filter layer contacts with a long edge of the wiring 403 extending along the first direction. The plurality of protrusions 4031 can reduce the rupture risk of the film forming the color filter layer, and the portion of the wiring 403 extending along the first direction is arranged in the peripheral region so that displaying would not be affected even if there are a few ruptures of the film forming the color filter layer.

Particularly, in the peripheral region 401b, a first color filter layer is further formed above the wirings 403. The first color filter layer refers to a color filter layer firstly formed on the base 401 when forming color filters. The wirings 403 in the peripheral region 401b are covered by the first color filter layer, so that no sharp chamfer would be formed at an upper edge of the wiring 403 when etching the first color filter layer and subsequent color filter layers, therefore defects such as rupture of the films forming color filters due to sharp chamfers of the upper edge of the wiring 403 would not occur.

Optionally, the wiring may be further in a polygonal line shape or a curved shape, so as to also prevent the sharp chamfers of the edge of the wiring from being aligned in a line, and prevent defects such as rupture of the films forming the color filter layers when applying the color filter layers.

Optionally, the wiring is made of metal or transparent metal oxide.

Optionally, the protrusions and the wirings are made of the same material and are formed in the same process.

In some embodiments, the length of the protrusion is within a range from the length of one color filter to the length of five color filters.

Embodiments of the disclosure further provide a touch display device, which includes the above mentioned color filter substrate.

It is noted that embodiments merely illustratively illustrate the structure of the wiring in the touch structure, and it should be understood by those skilled in the art that the description of other known structures may be omitted or not given in detail.

It is obvious for those skilled in the art that various modifications and variants can be made to the present disclosure without departing the spirit of the present disclosure. If these modifications and variants of the present disclosure fall into the scope of the claims and its equivalent of the present disclosure, the present disclosure is also intended to include these modifications and variants.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

We claim:

1. A color filter substrate, comprising:
a base;
a black matrix layer disposed on the base;
a wiring layer disposed on the black matrix layer and comprising a plurality of wirings; and
a color filter layer disposed on the wiring layer and comprising a plurality of color filters,
wherein each of the plurality of wirings includes an extending portion extending in a first direction and a plurality of protrusions projecting out from a side of the extending portion in a second direction, and wherein both of the first direction and the second direction are substantially perpendicular to a light transmitting direction.

2. The color filter substrate of claim 1, wherein the plurality of wirings are shielded by the black matrix layer in the light transmitting direction.

3. The color filter substrate of claim 1, wherein, the extending portion has a trapezoid cross section and a short bottom edge of the trapezoid cross section is disposed adjacent to the base.

4. The color filter substrate of claim 1, wherein, the wirings are touch signal transmitting wirings and respectively connected to corresponding touch electrodes.

5. The color filter substrate of claim 1, wherein the protrusion is shielded by the black matrix layer in the light transmitting direction.

6. The color filter substrate of claim 1, wherein, a length of the protrusion in the first direction is within a range from a length of one color filter to a length of five color filters.

7. The color filter substrate of claim 1, wherein, the wiring is made of metal or transparent metal oxide.

8. The color filter substrate of claim 1, further comprising a display region and a peripheral region, and the plurality of wirings extend along the first direction in the peripheral region.

9. The color filter substrate of claim 1, wherein, the color filter layer is formed through three coating processes and three etching processes, and the first direction is perpendicular to a coating direction of each coating process.

10. A touch display device, comprising the color filter substrate of claim 1.

11. The color filter substrate of claim 1, wherein a thickness of the extending portion is substantially equal to a thickness of the protrusion thereof.

12. The color filter substrate of claim 1, wherein the extending portion is straight.

13. The color filter substrate of claim 1, wherein the second direction is substantially perpendicular to the first direction.

14. The color filter substrate of claim 1, wherein the second direction is substantially perpendicular to the side of the extending portion.

15. The color filter substrate of claim 1, wherein the extending portion and one of the plurality of protrusions thereof enclose a hollow area.

16. The color filter substrate of claim 15, wherein the hollow area exposes at least one color filter.

\* \* \* \* \*